United States Patent [19]
Watts

[11] Patent Number: 5,310,420
[45] Date of Patent: May 10, 1994

[54] REFRACTORY CONTAINING INVESTMENT MATERIAL AND METHOD OF MAKING

[75] Inventor: Claude Watts, Mayfield Heights, Ohio

[73] Assignee: Precision Metalsmiths, Inc., Cleveland, Ohio

[21] Appl. No.: 948,013

[22] Filed: Sep. 21, 1992

[51] Int. Cl.$^5$ ............................................. B28B 7/34
[52] U.S. Cl. .................................. 106/38.9; 164/528; 164/529
[58] Field of Search ................ 106/35, 38.2–38.9, 106/772; 164/528, 529

[56] References Cited

U.S. PATENT DOCUMENTS

| | | | |
|---|---|---|---|
| 1,888,441 | 8/1930 | Weidemann | 106/38.9 |
| 1,924,874 | 8/1933 | Moore | 106/38.9 |
| 2,216,555 | 10/1940 | King | 106/772 |
| 3,303,030 | 2/1967 | Preston | 106/38.3 |
| 3,436,236 | 4/1969 | Gamber et al. | 106/38.9 |
| 4,106,945 | 8/1978 | Erndt | 106/38.5 |

Primary Examiner—Helene Klemanski
Assistant Examiner—Margaret Einsmann
Attorney, Agent, or Firm—Watts Hoffmann Fisher & Heinke

[57] ABSTRACT

An improved refractory investment material for use in making refractory molds is provided. The material comprises an investment powder including a binder, a refractory selected from calcined mullite and pyrophyllite, additives for controlling setting and about 0.01 to about 0.04% by weight of a sulfate salt. The investment powder is formed into a slurry with a solution of a water based colloidal silica in an amount providing about 3% to about 6% by weight colloidal silica based on the weight of the water and a chloride salt in an amount of at least about 0.5% by weight based on the weight of said investment powder.

16 Claims, 3 Drawing Sheets

REFRACTORY CONTAINING INVESTMENT MATERIAL AND METHOD OF MAKING

BACKGROUND OF THE INVENTION

The present invention relates generally to the investment casting art, and more specifically to a new investment material for use in making refractory molds.

Investment casting molds are typically made by preparing a pattern assembly or tree comprising of a plurality of patterns having the configurations of the desired metal castings, the patterns being made of wax, plastic or other expendable material. The combination of the tree or runner system and patterns is referred to as the set-up. To form the mold, the pattern or patterns are placed into a flask which is then filled with a refractory investment slurry. The slurry is allowed to harden in the flask around the pattern to form the mold. After the investment slurry has hardened, the patterns are melted out of the mold by heating in an oven, furnace or autoclave. The mold is then fired to an elevated temperature, e.g., 1350° F., to remove water and burn off any residual pattern material in the casting cavities. In many instances, the mold is first cooled to a lower temperature in order to obtain optimum casting conditions before filling it with molten metal. For example, when casting aluminum it is the practice to cool the mold to anywhere from room temperature to about 400° or 500° F. before filling it with the molten metal.

Conventional investment formulations used for nonferrous molds are comprised of a binder and a refractory made up of a blend of fine and coarse particles. The refractory usually is wholly or at least in part silica, such as quartz, cristobalite or trydymite. Other refractories such as calcined mullite and pyrophyllite can also be used as part of the refractory. The binder is typically fine gypsum powder (calcium sulfate hemihydrate).

The binder and refractory, together with minor chemical additives to control setting or hardening characteristics, are dry blended to produce the dry investment powder. The dry investment is then prepared for use by mixing it with a sufficient amount of liquid, such as water, to form a slurry which can be poured into the flask around the set-up. Vacuuming of the slurry and vibration of the flask are frequently employed steps to eliminate air bubbles and facilitate filling of the flask.

A serious problem encountered with conventional investment molds is the frequent occurrence of cracking during the heating and/or cooling cycles and during the metal casting operation itself. If a vacuum is applied to the molds during pouring of the molten metal, the molds are subjected to additional stresses which can contribute to the cracking. Mold cracking results in metal flash on the castings which must be removed by expensive finishing operations, and permits particles or flakes of investment to break loose and fall into the mold cavities. This can produce inclusions in the castings and cause them to be rejected. In instances where cracking is especially severe, the molten metal can leak through the mold wall so that the entire mold must be scrapped.

Another problem associated with the use of gypsum bonded refractory investments is the tendency for the refractory particles to settle away from underneath the surfaces of the disposable pattern materials after the investing operation is completed, but before the investment has hardened. This type of defect is a source of rejected castings and is believed to be the result of a watery layer that forms between the pattern surface and the slurry like investment when it is still relatively fluid.

Still another source of rejects is concerned with castings that are out of tolerance from a dimensional standpoint. There are many variables involved with dimensional problems including those resulting from sudden volumetric changes that occur due to dehydration of the binder during the firing of the mold, the thermal expansion characteristics of the refractory, and the temperature differential between different sections of the mold. All of these can contribute to the distortion of the mold cavity after the pattern has been eliminated.

SUMMARY OF THE INVENTION

It is an object of the invention to provide a refractory investment material that is less susceptible to mold cracking than anything previously available. The material is thixotropic and will thicken when it forms around the patterns after investing so as to substantially eliminate the watery layer that sometimes forms between the pattern and the mold material.

It is a further object to provide an investment material that has a low linear thermal expansion when heated to casting temperatures and does not exhibit sudden expansion or contraction upon heating from room temperature to the maximum firing temperature or during the cooling and shrinkage phases of the firing sequence. The applicant has found that a thixotropic investment slurry which has comparatively low thermal expansion and which does not exhibit sudden volumetric expansion and contraction will greatly reduce thermal shock resulting in substantially crack free molds, less distortion in the mold cavities and fewer rejects due to core failure.

According to one aspect of the invention the foregoing objects are achieved by the formulation and use of a novel aqueous refractory slurry of investment powder comprising refractory, binder, a sulfate salt in an amount of from about 0.01 to about 0.04% by weight based on the weight of investment powder, a chloride salt in an amount of at least about 0.5% by weight based on the weight of investment powder, and from about 3% to about 6% by weight colloidal silica based on the weight of water. Preferred formulations of the aqueous slurry are prepared with refractory selected from at least one member of the class consisting of mullite and pyrophyllite, chloride salt selected from at least one member of the class consisting of sodium chloride, magnesium chloride and calcium chloride, and sulfate salt selected from at least one member of the class consisting of alums, magnesium sulfate and potassium sulfate.

One specific formulation of the new aqueous slurry according to the invention comprises an investment powder consisting essentially of at least one refractory selected from the class consisting of mullite and pyrophyllite, and in amounts by weight based on the total weight of investment powder, from about 25% to about 35% alpha gypsum, from about 0.01% to about 0.04% of a sulfate salt, and from about 0.07% to about 0.15% setting agents. The slurry includes colloidal silica in an amount of about 3% to about 6% based on the weight of water, and a chloride salt in an amount of from about 0.5% to about 2.0% by weight based on the weight of investment powder. A particularly suitable sulfate salt is aluminum sulfate and preferred slurries contain a chloride salt selected from the class consisting of calcium chloride, sodium chloride and magnesium chloride in an amount of from about 0.5% to 1.0%.

According to another embodiment of the invention there is provided an investment powder for use in making refractory molds comprising a refractory, a binder and sulfate salt in an amount of from about 0.01 to about 0.04% based on the weight of the powder. In preferred investment powders the refractory is at least one member selected from the class of mullite and pyrophyllite, and the sulfate salt is at least one member selected from the class of alums, magnesium sulfate and potassium sulfate. When the refractory consists essentially of pyrophyllite, the sulfate salt is at least one salt selected from the class consisting of alums and magnesium sulfate. When the refractory is essentially mullite, the sulfate salt in one preferred embodiment is aluminum sulfate.

In another embodiment there is provided a method of preparing a refractory slurry for use in making investment molds comprising the steps of preparing an investment powder by blending together at least one refractory selected from the class of mullite and pyrophyllite, alpha gypsum in an amount of from about 25% to about 35% by weight based on the weight of powder, a sulfate salt in an amount of from about 0.01% to about 0.04% by weight based on the weight of powder, and setting agents in an amount of from about 0.07% to 0.15% by weight based on the weight of powder; and forming a slurry of the investment powder by adding an aqueous solution containing silica sol in an amount providing about 3% to 6% by weight colloidal silica based on the weight of water and a chloride salt in an amount of at least about 0.5% by weight based on the weight of powder.

In preferred embodiments, the investment powder and solution are mixed in a ratio of from about 28 to about 48 parts of solution to 100 parts of powder. When the refractory is essentially mullite, it is desirable to add the solution to the powder in an amount of from about 28 to about 33 parts by weight solution to 100 parts by weight powder. When the refractory is essentially pyrophyllite, it is desirable to add the solution to the powder in an amount of from about 44 to about 48 parts by weight solution to 100 parts by weight powder. When the refractory is a mixture of mullite and pyrophyllite, the solution is preferably added to the powder in an amount of from about 38 to about 42 parts by weight solution to 100 parts by weight powder.

These and other advantages and a fuller understanding of the invention will be had from the following detailed description of the invention.

DETAILED DESCRIPTION OF THE INVENTION

Figure 1:
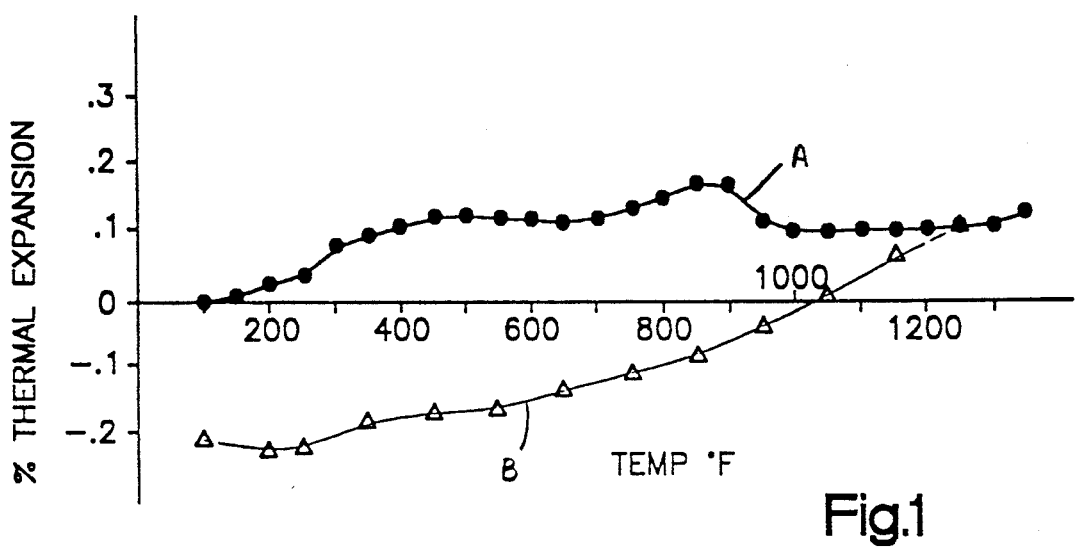
FIG. 1 shows the thermal expansion and contraction curves for an investment material according to the invention.

As generally described above, the invention provides an investment material formed from a novel dry investment powder comprising a refractory, about 25% to about 35% binder based on the weight of the investment powder, about 0.01 to about 0.04% of a sulfate salt based on the weight of the investment powder and small amounts of conventional additives for controlling setting. Suitable additives include terra alba and sodate as is known in the art. The dry investment is formed into a slurry with a solution of a water based silica sol in an amount providing about 3 to about 6% colloidal silica ($SiO_2$) based on the weight of the water, and which includes a chloride salt in an amount of at least about 0.5% by weight based on the weight of the dry investment powder.

Preferred refractories are mullite, pyrophyllite and mixtures thereof. When the refractory is calcined mullite both coarse and fine particles are typically used. The use of some coarse refractory reduces the liquid to powder ratio in the investment material and increases the strength of the mold material. The coarse refractory comprises about 20% of the investment powder, although the amount of the coarse refractory can vary from 0% to about 20% depending on the desired characteristics of the material and the particular use to which the mold will be put. The fine refractory comprises about 50% of the investment powder, although it can range as high as 75%. A preferred fine calcined mullite is available from Combustion Engineering Inc., under the trade name Mulgrain 60-200IC, and a preferred course mullite is Mulgrain 47-25X80s, available from the same supplier.

Calcined mullite is fairly expensive and it has been found that satisfactory results can be obtained for many applications when all or a part of the calcined mullite refractory is replaced with pyrophyllite. Pyrophyllite is an economical, naturally occurring hydrous aluminum silicate mineral available under the trade name Pyrax from the R. T. Vanderbilt Co., Inc., Norwalk, Conn. Typically, pyrophyllite is present in an amount of about 65 to 74% of the investment powder when no calcined mullite is used.

Investment materials made using pyrophyllite as part or all of the refractory filler exhibit more thermal expansion than those using all calcined mullite. However, the thermal expansion is still lower, more gradual and more uniform than either cristobalite or quartz which are used in practically all of the commercially available gypsum bonded investment materials on the market today. Pyrophyllite also has the unique property of having a permanent expansion after heating so that, although it does exhibit some shrinkage on cooling, there are no sharp volumetric or expansion fluctuations. When the investment formula contains pyrophyllite as all of the refractory ingredient, the thermal expansion after firing and cooling to room temperature will, in most cases, be larger than before firing.

The preferred binder is alpha gypsum in an amount of about 25 to 35% based on the weight of the powder, with good results obtained when the gypsum is present in an amount of about 30%. Hydrocal is a preferred alpha gypsum available from the United States Gypsum Company. It is necessary to have sufficient binder concentration so the molds can be handled during processing without physical damage. It may be desirable to vary the binder concentration depending upon special circumstances such as the size and shape of the patterns being invested and the size of the flask.

An important component of the investment powder that contributes to the unique thixotropic properties of the slurry is the sulfate salt. Suitable sulfate salts are potassium sulfate, magnesium sulfate and alums, such as aluminum sulfate and the like. When mullite is used as the refractory, the alums, preferably aluminum sulfate ($Al_2(SO_4)_3 n\ H_2O$ where n is 12-14), should be used in the range of 0.01 to 0.04% based on the weight of the dry investment. When pyrophyllite is used as the refractory, the preferred sulfate is magnesium sulfate ($MgSO_4.7H_2O$) in an amount of about 0.01 to about 0.04% by weight based on the weight of the dry investment.

Additives for controlling the setting characteristics include terra alba and sodate. Terra alba is an accelerator or set stabilizing agent and may be present in the investment powder in an amount ranging from about 0.05 to about 0.10% based on the weight of the powder. Sodate retarder may be added as required to obtain the desired setting time. This will usually be in the range of about 0.02 to about 0.05% based on the weight of the powder.

The dry investment powder is made into a slurry with a solution of a water based colloidal silica, called a silica sol, and a chloride salt. The chloride salt is preferably selected from the class of calcium chloride, sodium chloride and magnesium chloride, the preferred salt being calcium chloride ($CaCl_2.2H_2O$) or magnesium chloride ($MgCl_2.6H_2O$). While sodium chloride works well with pyrophyllite, the advantageous thermal characteristics imparted to the system are limited when used with mullite if fired at temperature above 1100° F. The chloride salt is added to the silica sol and water solution in an amount of at least about 0.5% by weight based on the weight of the investment powder. The preferred range of chloride salt is about 0.5% to about 1.0%. The thixotropic properties of the slurry are dependent upon the presence of the silica sol, the chloride salt and the sulfate salt. If any of these components are eliminated, the slurry will not be thixotropic.

Slurries made with silica sols that are not compatible with the chloride salts, and thus precipitate out, are not thixotropic. Thus, to maintain the desirable thixotropic property of the invention, the silica sol used should not precipitate out with the addition of chloride salts. It has been found, however, that freshly precipitated $SiO_2$ does act to provide a slurry with reasonably good suspending characteristics such that satisfactory castings have been made using silica sol solutions where the silica has been partially precipitated. The gel precipitate appears to prevent settling of the refractory so that, even though the thixotropic property is lost, the material will still provide reasonably good castings.

The preferred silica sol is Ludox LS produced by DuPont. Ludox LS has a low $Na_2O$ concentration of about 0.10% and the colloidal silica is not precipitated by additions of calcium chloride. The solution formula is stable for several hours after the addition of the calcium chloride, although the solution will eventually gel in about 5 hours. Therefore, it is desirable for production operations to prepare the solution formula for each batch of slurry immediately before the investment powder is added to the liquid formula. Satisfactory results have been obtained with colloidal silica concentrations in the range of about 3 to 6% based on the weight of the water.

According to the method of the invention, a refractory slurry is made by blending the refractory, the binder, the sulfate salt and any set controlling additives to form the dry investment powder. An aqueous solution of silica sol is prepared by diluting the silica sol to provide colloidal silica in an amount of about 3% to about 6% based on the weight of the water and adding the chloride salt in an amount of at least about 0.5% based on the weight of the dry investment powder. About 28 to 48 parts by weight of the solution is mixed with 100 parts of the dry investment powder to form the investment slurry. When the refractory in the investment powder is mullite, the aqueous solution is preferably mixed in an amount of about 28 to 33 parts by weight for every 100 parts by weight of the dry investment powder. When pyrophyllite is used as the refractory in the investment powder, about 44 to 48 parts by weight of the solution is mixed with 100 parts of the investment powder. When the refractory in the dry investment powder is a mixture of mullite and pyrophyllite the preferred method comprises mixing about 38 to 42 parts of solution to 100 parts investment powder.

EXAMPLE 1

An investment material was prepared by thoroughly mixing 45 lbs. alpha gypsum, 30 lbs. of course and 75 lbs. of fine calcined mullite, 34 grams terra alba, 13 grams alum and 27 grams sodate retarder in a ribbon blender to form a dry investment powder. The alpha gypsum was Hydrocal, commercially available from the United States Gypsum Co. Terra alba is a commercially available accelerator ($CaSO_4.2H_2O$), also available from the United States Gypsum Co., as is Sodate retarder. The calcined mullite, Mulgrain, was obtained from Combustion Engineering Inc., King of Prussia, Pa. The course mullite was Mulgrain 47-25X80s and the fine mullite was Mulgrain 60-200IC.

The typical sieve and chemical analysis of Mulgrain 47 25X80s are as follows:

| Sieve Analysis: U.S.S. Sieve No. | % ON |
| --- | --- |
| 20 | 0–5 |
| 50 | 77–83 |
| 70 | 11–17 |
| Pan | 2 max |

| Chemical Analysis: | Percent by Weight |
| --- | --- |
| Alumina ($Al_2O_3$) | 47.8 |
| Silica ($SiO_2$) | 49.3 |
| Titanium dioxide ($TiO_2$) | 1.78 |
| Ferric Oxide ($Fe_2O_3$) | 0.98 |
| CaO | 0.03 |
| MgO | 0.04 |
| $Na_2O$ | 0.04 |
| $K_2O$ | 0.03 |

The typical sieve and chemical analysis of Mulgrain 60-200IC are as follows:

| Sieve Analysis: U.S.S. Sieve No. | % ON |
| --- | --- |
| 100 | Tr |
| 200 | 15–25 |
| Pan | 75–85 |

-continued

| Chemical Analysis: | Percent by Weight |
| --- | --- |
| Alumina (Al$_2$O$_3$) | 60.5 |
| Silica (SiO$_2$) | 35.8 |
| Titanium dioxide (TiO$_2$) | 2.25 |
| Ferric Oxide (Fe$_2$O$_3$) | 1.31 |
| CaO | 0.04 |
| MgO | 0.05 |
| Na$_2$O | 0.02 |
| K$_2$O | 0.03 |

The dry investment was mixed into a slurry using a water based solution of 9 lbs. Ludox LS, 36 lbs. water, and 680 grams of CaCl$_2$.2H$_2$O. The liquid to powder ratio was 30:100 liquid to powder, i.e., about 45 lbs. solution to 150 lbs. powder.

Three pattern set-ups were prepared for casting. The flasks were invested using the investment formula and silica sol solution described above. Vacuum mixing and investing were accomplished in the automatic investing equipment disclosed in U.S. Pat. No. 3,719,214, incorporated herein by reference. The patterns were chosen to reflect some of the more complex configurations that were difficult to cast using commercially available investment materials. Two flasks measured 9 inches in diameter and 10 inches high, and the third flask was 12 inches in diameter and 10 inches high. The flasks were invested and allowed to harden at room temperature for one hour after the initial set had taken place.

The investment material was sufficiently thixotropic so that immediately after investing the slurry thickened. No deleterious watery layer was apparent between the pattern surface and the mold material, and the course refractory particles did not settle away.

The mold was then subjected to pattern melt-out, firing and cooling cycles. The pattern was melted out, i.e., dewaxed, at 450° F. for 4 hours. Next the mold was fired at 550° F. for 2 hours, then at 750° F. for 2 hours, at 950° F. for 30 minutes, at 1250° F. for 7 hours, and finally allowed to cool down to 500° F. for casting. Molten 356 aluminum alloy at 1300° F. was poured into the mold using a gravity pour plus vacuum assist method. Vacuum was maintained in the casting chamber for 5 minutes after cast while atmospheric pressure acted on the head of the metal.

The flasks were cooled to room temperature and the investment mold material removed by a combination of knock-out hammer and water blast. Upon inspection the castings were found to be good in every respect. All surfaces were smooth and there was no flash.

Figure 2:
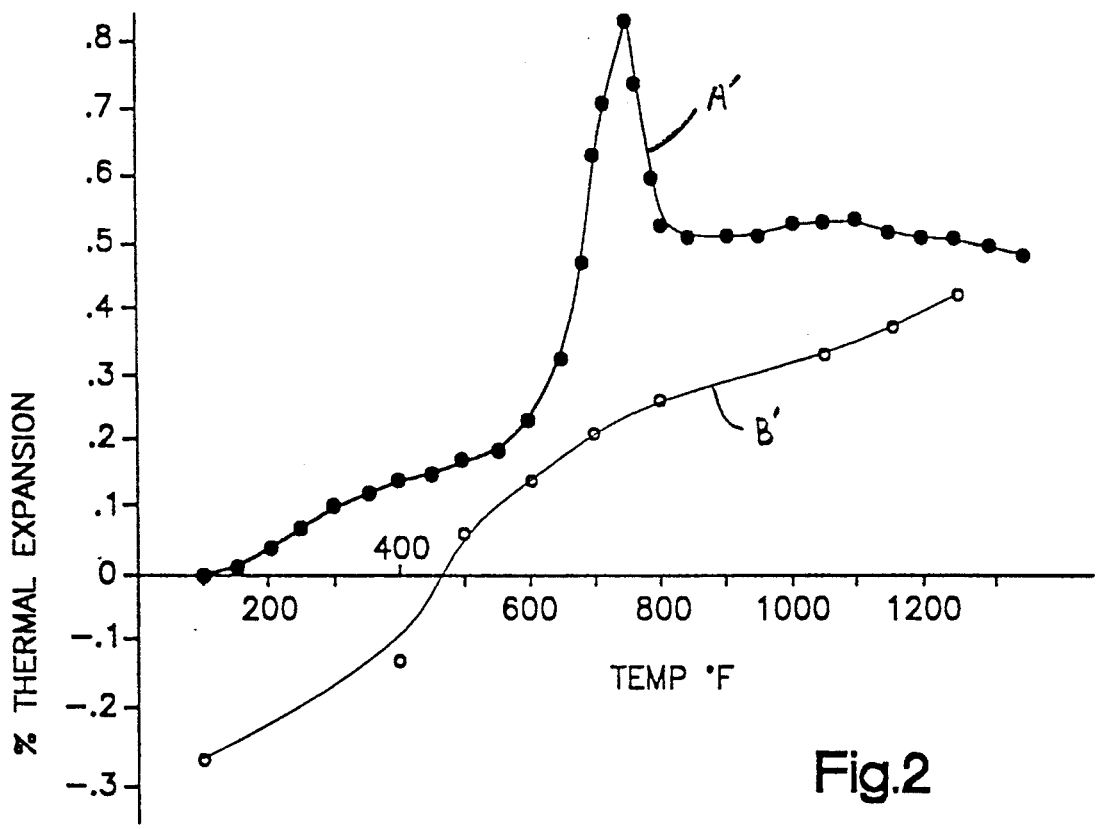
FIG. 2 shows the thermal expansion and contraction curves for a commercially available investment material.
Figure 3:
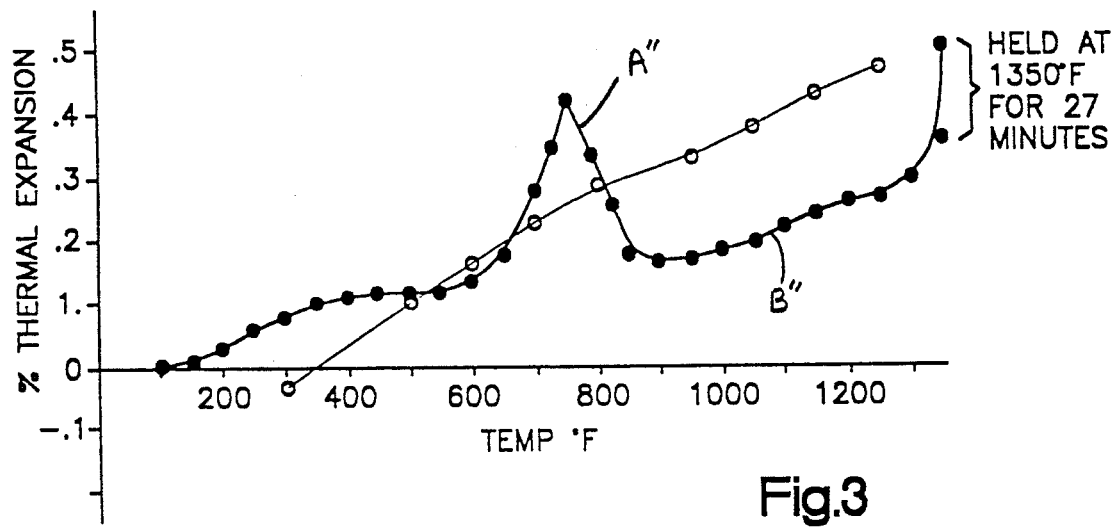
FIG. 3 shows the thermal expansion and contraction curves for another commercially available investment material.

Thermal expansion and contraction measurements of the material of Example 1 were obtained using a manual Dilatometer Model I.E. manufactured by Theta Industries Inc. It was equipped with a model 6474 measuring head and a fused silica tube and push rod. Temperature measurements were taken from the thermocouple and temperature indicating gage supplied with the instrument. Curve A in FIG. 1 shows the thermal expansion of the material up to 1350° F. A maximum thermal expansion of 0.175% occurs at 850° F. followed by a shrinkage on heating to 0.10% at 1000° F. Continued heating results in further thermal expansion to about 0.13% at 1350° F. The thermal contraction curve B shows a gradual shrinkage from 1350° F. at 0.13% to a −0.23% at 200° F. FIGS. 2 and 3 show thermal expansion and contraction curves A', A" and B', B" respectively, for two commercially available gypsum bonded investments. As can be seen from a comparison of these curves, the investment material of the invention exhibits significantly less thermal expansion and contraction with a much more gradual and uniform transition.

EXAMPLE 2

A dry investment powder was prepared from 5 lbs. 11 oz. gypsum binder (Hydrocal), 13 lbs. 5 oz. pyrophyllite (Pyrax RG-20), 4 grams terra alba, 3.5 grams MgSO$_4$.7-H$_2$O and 5 grams sodate. The dry investment powder was made into a slurry with a solution of 1 lb. 13 oz. silica sol (Ludox LS), 7 lbs. 2 oz. water and 71 grams CaCl$_2$.2H$_2$O. The liquid to powder ratio was 46:100, or 8 lbs. 3 oz. of solution to 17 lbs. 12 oz. of powder. Typical chemical and sieve analysis for Pyrax RG-20 are as follows:

| Sieve Analysis: U.S.S. Sieve No. | % ON |
| --- | --- |
| 20 | .09 |
| 30 | 6.66 |
| 40 | 13.99 |
| 50 | 11.47 |
| 70 | 8.01 |
| 100 | 7.63 |
| 140 | 6.42 |
| Pan | 45.73 |

| Chemical Analysis: | Percent by Weight |
| --- | --- |
| Alumina (Al$_2$O$_3$) | 19.77 |
| Silica (SiO$_2$) | 75.0 |
| Ferric Oxide (Fe$_2$O$_3$) | 0.7 |
| CaO | 0.1 |
| MgO | 0.1 |
| Na$_2$O + K$_2$O | 0.3 |
| Loss on Ignition | 3.9 |

A composite set-up of a variety of wax patterns of different sizes and configurations was prepared. The patterns were wax welded to a center tree prepared according to U.S. Pat. No. 3,443,627, incorporated herein by reference. The cardboard tube and wax coated corrugated cardboard measured 12 inches high and about 2⅜ inches in diameter. The metal flask measured 10 inches high and 7 inches in diameter. The powder was added to the solution while stirring in a Hobart mixer using a wire whip. Mixing was continued for about 1 minute. The resulting slurry was vacuumed under a bell jar, then poured into the flask and vacuumed again. The invested flask was allowed to set at room temperature for 1 hour. The melt-out, firing cycle and casting operation were conducted as in Example 1. The resultant castings were good in every respect. The surfaces were smooth and there was no flash.

Figure 4:
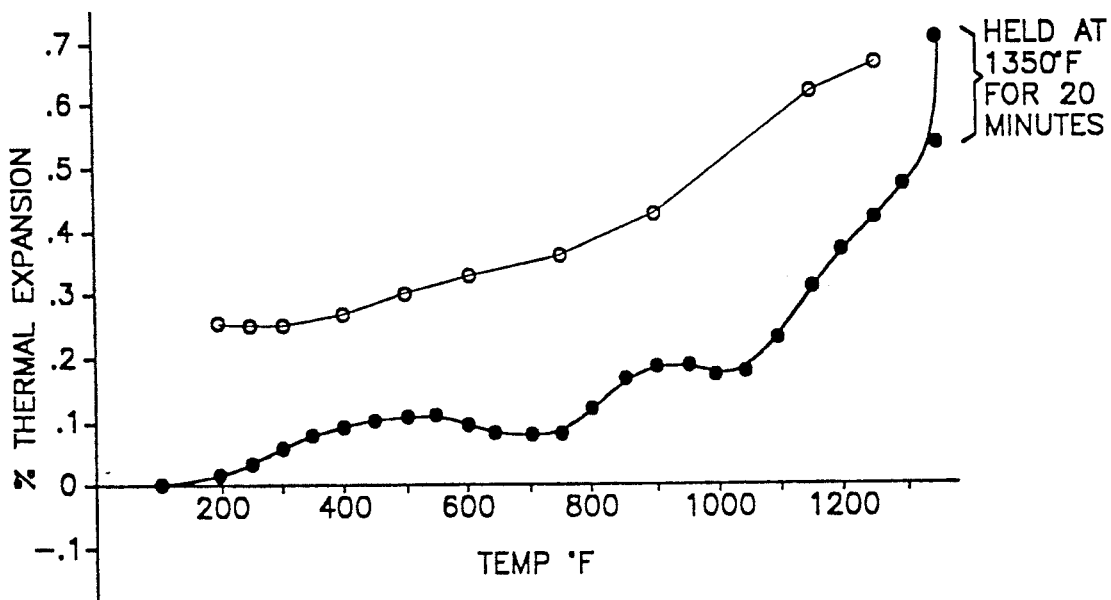
FIG. 4 shows the thermal expansion and contraction curves for another investment material according to the invention.

The use of pyrophyllite in investment materials was originally disclosed in U.S. Pat. No. 4,106,945. A thermal expansion curve of a commercially available pyrophyllite refractory is shown in FIG. 3. A sharp expansion followed by substantial shrinkage occurs during heating. There is evidence that the commercial pyrophyllite investment does in some instances produce less mold cracking and therefore less flash. However, mold cracking is still a problem. FIG. 4 shows the thermal expansion and contraction curve for the material of Example 2. As can be seen, there is no sharp expansion peak in the 650° F. range as in the commercially available material.

In the instant invention, the benefits of pyrophyllite are combined with the inventive use of a silica sol in combination with chloride and sulfate salts. This combination produces a gypsum bonded refractory investment material with a reduced shrinkage during the firing cycle and less mold cracking. The thixotropic properties of the material result in a more perfect formation of the refractory mold material around the disposable patterns, and the silica sol also contributes to slightly higher green mold strength and additional fired strength. Additional fired strength is useful in assuring that delicate cores are firmly held in place during casting.

EXAMPLE 3

A dry investment powder was prepared by mixing 6 lbs. alpha gypsum (Hydrocal), 7 lbs. of pyrophyllite (Pyrax RG-20), 7 lbs. calcined mullite (Mulgrain 60-200IC), 4.5 grams terra alba, 1.8 grams alum and 3.6 grams sodate. The dry investment was formed into a slurry with a solution of 1 lb. 10 oz. silica sol (Ludox LS), 6 lbs. 6 oz. water and 64 grams $CaCl_2.2H_2O$. The liquid to powder ratio was 40:100, i.e., 8 lbs. solution to 20 lbs. powder.

Figure 5:
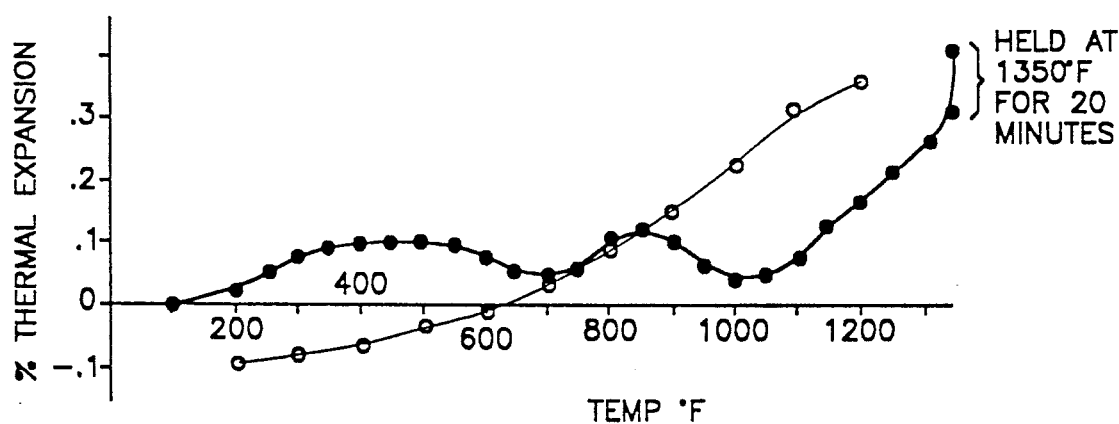
FIG. 5 shows the thermal expansion and contraction curves for another investment material according to the invention.

The material and castings were prepared as in the previous examples. The material yielded good castings with no flash. The thermal expansion and contraction curves for this material are shown in FIG. 5.

EXAMPLE 4

A dry investment power was prepared by mixing 6 lbs. 10 oz. alpha gypsum (Hydrocal), 4 lbs. 6 oz. calcined mullite (Mulgrain-45 25 X 80s), 11 lbs. calcined mullite (Mulgrain 60-200IC), 5 grams terra alba, 2 grams alum and 3 grams sodate. The dry investment was formed into a slurry with a solution of 1 lb. 6 oz. silica sol (Ludox LS), 5 lbs. 7 oz. water and 100 grams of magnesium chloride ($MgCl_2.6H_2O$). The liquid to powder ratio was 32:100, i.e., about 7 lbs. solution to 22 lbs. powder.

A composite set-up of a variety of wax patterns of different sizes and configurations was prepared. The investing and casting operations were carried out as in the previous examples. The flasks were loaded into the preheated melt-out oven and melted-out at 450° F. for 4 hours. The flasks were then fired at 550° F. for two hours, 750° F. for two hours, 950° F. for thirty minutes and 1350° F. for seven hours. The flasks were cooled to 500° F. and filled with 356 aluminum alloy for casting. The castings were inspected as in the previous examples and found to be good in every respect.

EXAMPLE 5

A dry investment powder was prepared by thoroughly mixing 6 lbs. 10 oz. alpha gypsum (Hydrocal), 4 lbs. 6 oz. calcined mullite (Mulgrain 25 X 80s), 11 lbs. calcined mullite (Mulgrain 60-200IC), 5 grams terra alba, 1 gram alum and 5 grams sodate. The dry investment was formed into a slurry with a solution of 1 lb. 6 oz. silica sol (Ludox LS), 5 lbs. water and 100 grams sodium chloride (NaCl). The liquid to powder ratio was about 30:100, i.e., about 6 lbs. 10 oz. solution to 22 lbs. powder.

A composite set-up of a variety of wax patterns of different sizes and configurations was prepared. The investing and casting operations were carried out as in the previous examples. The patterns were melted-out in an oven preheated to 450° F. for 4 hours. The flasks were then fired at 550° F. for 2 hours, 750° F. for 2 hours and 1100° F. for 6 hours. For this material care was taken not to exceed 1150° F. since the thermal advantages are limited by the sodium chloride. 356 aluminum alloy was cast upon cooling the flasks to 500° F. The flasks were cooled to room temperature, the castings knocked out and cleaned by water blasting. Inspection showed that the castings were good in every respect. The surfaces were smooth and there was no flash.

Many variations and modifications of the invention will be apparent to those of ordinary skill in the art in light of the foregoing detailed disclosure. Therefore, it is to be understood that, within the scope of the appended claims, the invention can be practiced otherwise than as specifically described.

What is claimed is:

1. In an aqueous slurry of investment powder for use in making investment molds, the powder including refractory and binder, the improvement comprising a sulfate salt in an amount of from about 0.01% to about 0.04% by weight based on the weight of investment powder, a chloride salt in an amount of at least about 0.5% by weight based on the weight of investment powder, and from about 3% to about 6% by weight colloidal silica based on the weight of water.

2. An aqueous slurry according to claim 1 wherein the refractory is at least one member selected from the class consisting of mullite and pyrophyllite.

3. An aqueous slurry according to claim 1 or 2 wherein the chloride salt is at least one member selected from the class consisting of sodium chloride, magnesium chloride and calcium chloride.

4. An aqueous slurry according to claim 1 or 2 wherein the sulfate salt is at least one member selected from the class consisting of alums, magnesium sulfate and potassium sulfate.

5. An aqueous slurry according to claim 1 wherein the refractory consists essentially of mullite.

6. An aqueous slurry according to claim 5 wherein the sulfate salt is an alum.

7. An aqueous slurry according to claim 5 wherein the sulfate salt is aluminum sulfate.

8. An aqueous slurry for use in making refractory molds comprising:
   a) an investment powder consisting essentially of at least one refractory selected from the class consisting of mullite and pyrophyllite, and in amounts by weight based on the total weight of investment powder, from about 25% to about 35% alpha gypsum, from about 0.01% to about 0.04% of a sulfate salt, and from about 0.07% to about 0.15% setting agents,
   b) colloidal silica in an amount of about 3% to about 6% based on the weight of water, and
   c) a chloride salt in an amount of from about 0.5% to about 2.0% by weight based on the weight of investment powder.

9. An aqueous slurry according to claim 8 wherein the refractory consists essentially of pyrophyllite and the sulfate salt is at least one salt selected from the class consisting of alums and magnesium sulfate.

10. An aqueous slurry according to claim 8 wherein the refractory is essentially mullite and the sulfate salt is an alum.

11. An aqueous slurry according to claim 9 or 10 wherein the sulfate salt is aluminum sulfate.

12. An aqueous slurry as claimed in claim 8 wherein the chloride salt is present in an amount of from about 0.5% to 1.0% and is selected from the class consisting of calcium chloride, sodium chloride and magnesium chloride.

13. A method of preparing a refractory slurry for use in making investment molds comprising the steps of:
  a) preparing an investment powder by blending together at least one refractory selected from the class of mullite and pyrophyllite, alpha gypsum in an amount of from about 25% to about 35% by weight based on the weight of powder, a sulfate salt in an amount of from about 0.01% to about 0.04% by weight based on the weight of powder, and setting agents in an amount of from about 0.07% to 0.15% by weight based on the weight of powder,
  b) preparing an aqueous solution of silica sol in an amount providing about 3% to 6% by weight colloidal silica based on the weight of water, and a chloride salt in an amount of at least about 0.5% by weight based on the weight of powder, and
  c) mixing the investment powder and solution in a ratio of from about 28 to about 48 parts of solution to 100 parts of powder.

14. A method according to claim 13 wherein the refractory is essentially mullite, and the solution is added to the powder in an amount of from about 28 to about 33 parts by weight solution to 100 parts by weight powder.

15. A method according to claim 13 wherein the refractory is essentially pyrophyllite and the solution is added to the powder in an amount of from about 44 to about 48 parts by weight solution to 100 parts by weight powder.

16. A method according to claim 13 wherein the refractory is a mixture of mullite and pyrophyllite, and the solution is added to the powder in an amount of from about 38 to about 42 parts by weight solution to 100 parts by weight powder.

* * * * *